(12) United States Patent
Pennington

(10) Patent No.: US 8,095,548 B2
(45) Date of Patent: Jan. 10, 2012

(54) METHODS, PROGRAM PRODUCT, AND SYSTEM OF DATA MANAGEMENT HAVING CONTAINER APPROXIMATION INDEXING

(75) Inventor: Matthew A. Pennington, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 525 days.

(21) Appl. No.: 12/251,065

(22) Filed: Oct. 14, 2008

(65) Prior Publication Data

US 2010/0094824 A1    Apr. 15, 2010

(51) Int. Cl.
G06F 7/00 (2006.01)
G06F 3/00 (2006.01)

(52) U.S. Cl. ............... 707/753; 707/747; 719/319

(58) Field of Classification Search ........... 707/999.002, 707/999.1, 623, 705, 753, 747; 719/310, 719/319
See application file for complete search history.

(56) References Cited

U.S. PATENT DOCUMENTS

| | | | |
|---|---|---|---|
| 4,809,158 A | 2/1989 | McCauley | |
| 5,202,986 A | 4/1993 | Nickel | |
| 5,490,269 A | 2/1996 | Cohn | |
| 5,857,196 A | 1/1999 | Angle | |
| 6,081,804 A | 6/2000 | Smith | |
| 6,094,661 A * | 7/2000 | Salomaki | 1/1 |
| 6,269,363 B1 | 7/2001 | Matias | |
| 6,278,992 B1 | 8/2001 | Curtis et al. | |
| 6,519,593 B1 | 2/2003 | Matias | |
| 6,532,457 B1 | 3/2003 | Tal | |
| 6,741,999 B2 | 5/2004 | Wagner | |
| 6,826,483 B1 * | 11/2004 | Anderson et al. | 702/13 |
| 6,874,062 B1 | 3/2005 | Goldberg | |
| 6,920,460 B1 | 7/2005 | Srinivasan et al. | |
| 6,990,485 B2 | 1/2006 | Forman | |
| 7,062,499 B2 | 6/2006 | Nehru | |
| 7,155,571 B2 * | 12/2006 | LaVoie et al. | 711/118 |
| 7,181,439 B1 * | 2/2007 | Lent et al. | 1/1 |
| 7,293,022 B2 | 11/2007 | Murray | |
| 7,558,806 B2 * | 7/2009 | Bobrovskiy et al. | 1/1 |
| 2003/0154266 A1 * | 8/2003 | Bobick et al. | 709/223 |
| 2004/0064819 A1 * | 4/2004 | LaVoie et al. | 719/310 |
| 2004/0233237 A1 * | 11/2004 | Randow | 345/763 |
| 2004/0260683 A1 | 12/2004 | Chan | |

(Continued)

FOREIGN PATENT DOCUMENTS

GB    2406681 A    6/2005

OTHER PUBLICATIONS

The International Search Report and the Written Opinion for PCT/US2009/060573; Dated: Jan. 11, 2010.

Primary Examiner — Mohammad Ali
Assistant Examiner — Bao Tran
(74) Attorney, Agent, or Firm — Bracewell & Giuliani, LLP

(57) ABSTRACT

Systems, program product, and methods of data management are provided. The system can include a computer having memory, a dataset including a relatively large number of records, and container approximation indexing program product stored in the memory of the computer and adapted to cause the computer to sort the dataset of records by key field values into a finite number of data containers being less than or equal to a maximum number of file descriptors permitted to be simultaneously opened.

19 Claims, 8 Drawing Sheets

U.S. PATENT DOCUMENTS

| | | |
|---|---|---|
| 2005/0132417 A1* | 6/2005 | Bobrovskiy et al. ............ 725/134 |
| 2006/0282411 A1 | 12/2006 | Fagin |
| 2007/0088699 A1 | 4/2007 | Edmondson |
| 2007/0100792 A1* | 5/2007 | Lent et al. .......................... 707/1 |
| 2008/0263554 A1* | 10/2008 | Rosu et al. ...................... 718/102 |
| 2008/0270422 A1* | 10/2008 | Craft et al. ..................... 707/100 |
| 2009/0074557 A1* | 3/2009 | Berger et al. ................... 414/806 |
| 2009/0327215 A1* | 12/2009 | Zhu et al. ........................... 707/2 |

\* cited by examiner

Distribution Chart

One Standard Distribution Chart

Distribution Chart

One Standard Distribution Chart

Distribution Chart

One Standard Distribution Chart

Distribution Chart

One Standard Distribution Chart

METHODS, PROGRAM PRODUCT, AND SYSTEM OF DATA MANAGEMENT HAVING CONTAINER APPROXIMATION INDEXING

BACKGROUND OF THE INVENTION

1. Field of the Invention

The invention relates to the field of data management, and particularly to indexing or sorting data by key fields to reduce search time requirements.

2. Description of Related Art

For discussion purposes, large datasets typically include billions of unique records which correspond to terabytes of raw data. The ability to search large datasets is a complex task, and tile ability to efficiently search key fields in such large datasets is extremely challenging.

Traditional methods of utilizing a general-purpose database are impractical due to both cost and complexity of required resources. Such costs can include both infrastructure and personnel costs.

An exhaustive search of such large data sets, for example, is easy to implement. Such searches, however, are inefficient in performance since search time is proportional to the size of the dataset. For example, a direct search of 20 billion records may take as many as five or more days on a single multiprocessor computer system using current computer technology.

Efficient searches that reduce the amount of time necessary to search such large databases are dependent on high cost solutions. Indexing algorithms, for example, have been introduced to try to reduce the time necessary to perform searches on datasets. Traditional indexing algorithms, although efficient for searching, are impractical to implement on large active datasets due to the quantity of the records introduced on a daily basis. The volumes of records, in addition to virtually unlimited key field values, are the main limiting factors to this approach. As all computing resources are finite, and as operating systems have a finite number of resources, file descriptors, I/O bandwidth, memory, and storage available, the traditional indexing algorithms simply break down when the data is generated faster than the data can be indexed on a single multiprocessor computer.

Unfortunately, splitting up the work among a set of servers, although providing a methodology of overcoming at least some of the limitations of traditional indexing algorithms, is extremely complex, and increases the overall cost, both in personnel, and in hardware resources. Further, implementation of a distributed database is also not a realistic, or at least not a preferred option, again, due to infrastructure and personnel cost, as well as limited products/solutions.

Accordingly, recognized is the need for a system, program product, and methods that can allow sorting or otherwise indexing data records in a dataset by key field value into a finite number of containers, effectively reducing the amount of time necessary to search the dataset by a factor of the number of containers, while maintaining placement of the records in linear time, that can also negate a requirement to distribute either the indexing or the searching across multiple physical systems.

SUMMARY OF THE INVENTION

In view of the foregoing, embodiments of the present invention advantageously provide system, program product and methods that can allow sorting or otherwise indexing data records in a dataset by key field value into a finite number of containers, effectively reducing the amount of time necessary to search the dataset by a factor of the number of containers, while maintaining placement of the records in linear time, that can also negate a requirement to distribute either the indexing or the searching across multiple physical systems. Embodiments of the present invention also advantageously provide a system, program product, and methods of managing data which can provide for indexing a dataset by key fields into a finite number of virtual containers (X containers) with each container holding approximately the same number of records, or at least providing a normalized distribution of records across containers. Regardless, advantageously, according to such embodiments of the present invention, an exhaustive search time would be reduced by nearly a factor of X, while the placement of records into containers is liner time, e.g., ($\Theta(n)$).

A system according to an embodiment of the present invention includes a computer, first computer memory associated with the computer, and a first program product defining an operating system stored in the first memory associated with the computer. The system also includes second memory separate from the first memory and in communication with the operating system so that the operating system enhances access to the second memory, and a dataset stored in the second memory and arranged so that a plurality of data records are positioned in a finite number of data containers. The system can also include second program product stored in the first memory and readable by the operating system of the computer to cause the computer to perform the operation of sorting (indexing) the dataset by key field values for each of the plurality of data records into a plurality of data containers numbering no more than approximately a maximum number of permitted file descriptors which can be opened by the computer and so that the plurality of data records has a substantially normalized distribution among the plurality of data containers. Advantageously, such organization substantially reduces the average amount of search time required to locate a specific record based on a key field value over that of an exhaustive search, while maintaining record placement in linear time.

Various embodiments of the present invention include a container approximation index program product to perform indexing of the plurality of records, which can be implemented as part of a system, as described above, for example, or as a standalone product stored in a computer readable tangible medium. According to an embodiment of the present invention, the program product can include instructions that when executed by a computer, cause the computer to perform the operations of sorting a dataset by key field values for each of a plurality of records into a finite number of data containers, the finite number of containers being no more than a maximum number of file descriptors permitted to be simultaneously opened. The operation of sorting a dataset by key field values can include, for each of the plurality of records, the operations of determining a key field value of the key field of the respective record, generating a digest of the key field value having a same fixed size for each of the plurality of records, modifying the digest to determine a container address for the respective record, and associating the respective record with the determined container address. According to an embodiment of the program product, the operation of generating a digest can include applying a hash function to the determined key field value. The operation of modifying the digest to determine a container address for the respective record can include applying to the digest a hash mask having a size equal to an integer value of the size of the digest minus a value proportional to $\log_2$(number of desired containers) to determine the container address for the record. The operation of associating the respective record with the determined container address can include the step of writing the respective record to the determined container address. This operation can include saving the record to an open container file or otherwise linking the respective record to the correlated container.

According to one embodiment of the present invention, the container approximation index program product also includes instructions for performing a data records search for the data records. According to another embodiment of the present invention, a separate search program product is provided for searching die containerized data records. Both exemplary embodiments of the container approximation index program product can employ a container approximation index algorithm to perform the sorting (indexing) function, described above.

A substantial and important difference that the Container Approximation Index algorithm has with traditional sorting algorithms is that this algorithm, according to an embodiment of the present invention, deliberately forces collisions in the containers to increase the speed of sorting. Further, according to an embodiment of the present invention, the Container Approximation Index algorithm is linear and can be finely tuned to match the number of containers to the maximum number of file descriptors that an operating system can support. As such, volatile memory requirements are not a function of the dataset size, whereas in traditional sorting algorithms, memory requirements are generally based on the dataset size.

According to an embodiment of the present invention, the Container Approximation Index algorithm includes a variation of a top-down radix sorting algorithm. According to this embodiment of the present invention, both algorithms sort various types of data by using numeric values for the key items to be sorted utilizing containers or buckets based on a portion, or radix, of the key value. The radix sorting algorithm, however, will fully sort a set of data, whereas the Container Approximation Index algorithm can be configured to only partially sort a set of data. As such, according to such embodiment of the present invention, the Container Approximation Index algorithm can be characterized as a "partial pass through" top-down radix sorting algorithm, then halting. Correspondingly, cascading the Container Approximation Index algorithm twice, according to another embodiment of the present invention, could be described as a "double pass through" radix sorting algorithm, then halting.

Accordingly, a notable difference between the Container Approximation Index algorithm and the top-down radix sort, according to either of the above-described embodiments of the present invention, is that the Container Approximation Index is incomplete; i.e., contrary to conventional wisdom, the data is not fully sorted (indexed). For small data sets, the notion of an incomplete sort is generally considered useless. For large data sets (e.g., typically billions of records), the benefits of an incomplete sort, however, can allow for a significant reduction in computer and personnel resources, while comparatively yielding, at worst, only a slightly degraded search time.

Embodiments of the present invention also include methods of data management. A method according to and embodiment of the present invention, can include the steps of determining a maximum number of file descriptors that can be open simultaneously by a selected computer, and sorting a dataset by key field values for each of a plurality of records into a finite number of data containers being no more than, but approximately equal to, the number of file descriptors. The step of sorting a data set by key field values comprises, for each of the plurality of records, the steps of determining a key field value of the key field of the respective record, generating, a digest of the key field value having a same fixed size for each of the plurality of records, modifying the digest to determine a container address for the respective record, and associating the respective record with the determined container address. The step of sorting a data set by key field values can further include tile step of increasing the number of containers while maintaining record placement of the plurality of records in linear time. This step can include decreasing, the size of the hash mask to define a next-pass hash mask, applying the next-pass hash mask to the digest of the key field value for each of tile plurality of records to determine a container address for each respective record, and associating each respective record with the determined container address. The method can further include the steps of searching for a specific record among a data set up at least a billion records responsive to the key field value of the record, performed by a single operating system of a multi-processor computer.

A method, according to another embodiment of the present invention, can include the step of arranging a database having a plurality of data records into a finite number of a plurality of data containers formed in memory of a computer readable tangible medium so that each of the plurality of containers has approximately the same number of the plurality of records and so that placement of each of the plurality of records has a substantially linear time relationship. For this embodiment of the method, the step of arranging call include, for each of the plurality of records, the steps of determining a digest of a key field value of the respective record, determining a container address for the respective record from a portion of the digest, and writing the respective record to the determined container address.

A method, according to another embodiment of the present invention, can include the step of arranging a dataset having a plurality of records into a plurality of data containers formed in memory of a computer readable tangible medium so that a distribution of the plurality of records comprises a substantially normalized distribution among the plurality of data containers and so that placement of each for the plurality of records has a substantially linear time relationship. For this embodiment of the method, the step of arranging can include, for each of the plurality of records, the steps of determining a digest of a key field value of the respective record, determining a container address for the respective record from a portion of the digest, and writing the respective record to the determined container address.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, howsoever be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

FIGS. 1-8 illustrate a system 30, program product, and methods for managing data, particularly, relatively large datasets. Such system 30, program product, and methods can allow sorting or otherwise indexing data records in a dataset by key field value into a finite number of containers ("X" containers), effectively reducing the amount of time necessary to search the dataset by a factor of X while maintaining placement of the records in linear time; and effectively negating a requirement to distribute either the indexing or the searching across multiple physical systems such as, for example, through distribution across a server farm.

Figure 1:
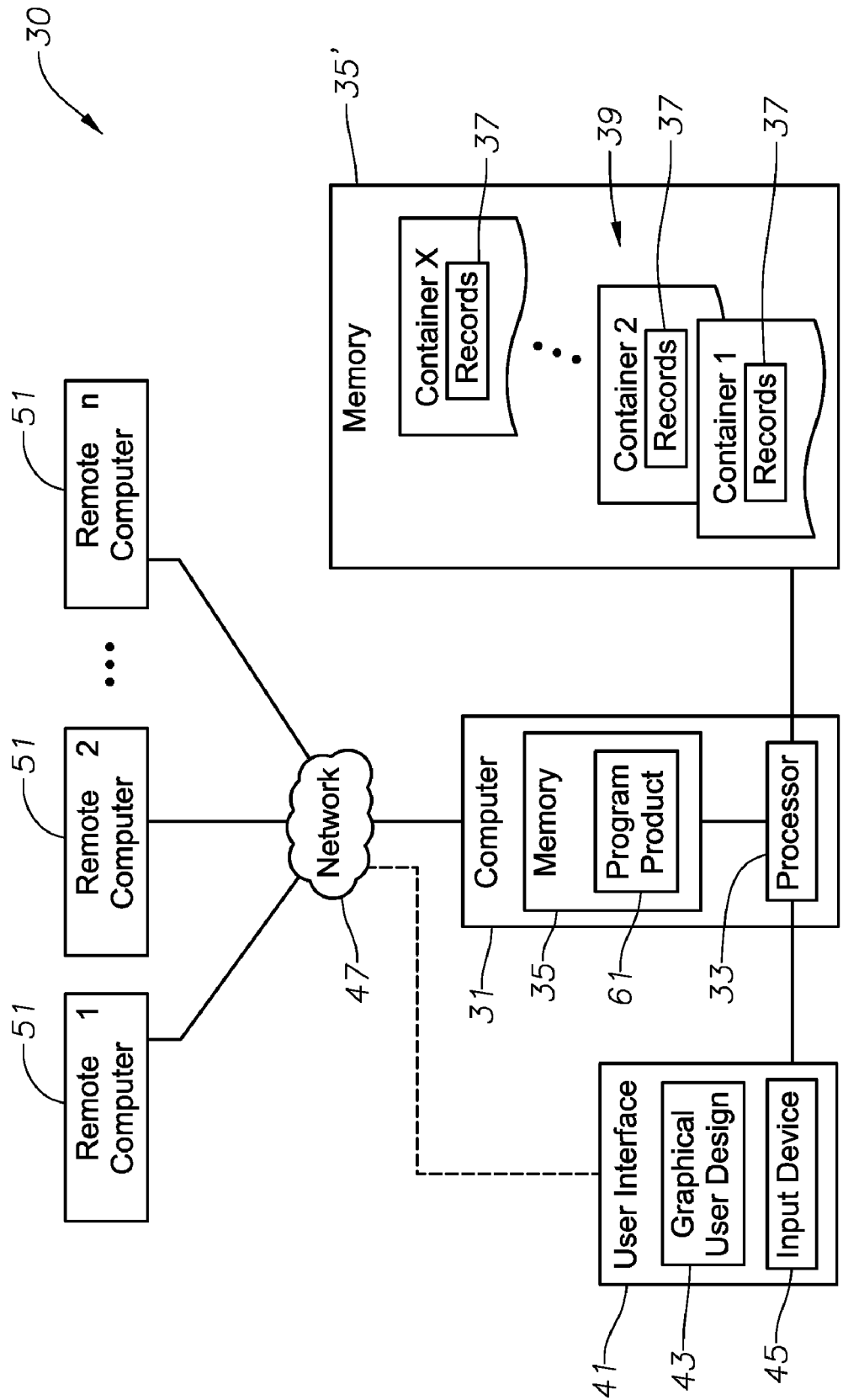
FIG. 1 is a schematic block diagram of a system for managing data according to an embodiment of the present invention.

FIG. 1, as noted above, illustrates an exemplary system 30 which can include a data management server or other form of computer 31. Such computer 31 can contain or otherwise include a single, or preferably, multiple processors (collectively processor 33), and memory 35 coupled to the processor 33 to store software. Note, the memory 35 can include volatile and nonvolatile memory known to those skilled in the art, including, for example, RAM, ROM, and magnetic or optical disks, just to name a few. Note also, it should also be understood that the preferred configuration of computer 31 is given by way of example and that other types of computers configured according to various other methodologies known to those skilled in the art, can be used.

The computer 31 can also include memory 35' (internal or external, networked, or non-networked) to store data records 37 therein (see also, FIG. 3), for example, connected directly to system/non-system components and/or networked to such components. As will be described in more detail below, the data records 37 are distributed among a plurality of virtual containers 39 ("X" containers 39) to enhance searching for specific records 37 of the plurality of records 37. The records 37 each have a key field with unique key field values, which can be used to both sort or otherwise index each of the records 37 into a specific container 39, and to search for each separate one of the records 37.

The system 30 can include a user interface 41 which can include a graphical display 43 for displaying graphical images, and a user input device 45 as known to those skilled in the art, to provide a user access to manipulate the software and data. Accordingly, the user interface 42 can be either directly connected to the computer 31 or through a network 47, as known to those skilled in the art.

The system 30 can also include a plurality of remote user computers 51 positioned remote from the computer 31 and in communication with the computer 31 through the network 47. Each computer 51, typically in the form of a personal computer, is positioned at various user locations to provide access to the data records 37.

The system 30 can also include container approximation index program product 61 stored, for example, in the memory 35 of the computer 31, to provide data management of the records 37. The container approximation index program product 61 can be in the form of microcode, programs, routines, and symbolic languages that provide a specific set or sets of ordered operations that control the functioning of the hardware and direct its operation, as known and understood by those skilled in the art. The program product 61, according to an embodiment of the present invention, need not reside in its entirety in volatile memory of the computer 31, but can be selectively loaded, as necessary, according to various methodologies as known and understood by those skilled in the art of computer systems.

The container approximation index program product 61 can include a set of instructions that, when executed by the computer 31, cause the computer 31 to perform various operations required to place or otherwise index each data records 37 into one of the containers 39, described in more detail below. According to one embodiment of the present invention, program product 61 also includes instructions for performing a data records search for the data records 37. According to another embodiment of the present invention, a separate search program product (not shown) is provided for searching the containerized data records. Both exemplary embodiments of the container approximation index program product 61 can employ a container approximation index algorithm, also described in more detail below.

According to various embodiments of the present invention, the indexing, sometimes referred to as a "Container Approximation Indexing," can synergistically and efficiently utilize/maximize utilization of finite computing resources. By keeping the number of containers less than or equal to the number of permitted open file descriptors limitation of the operating system, for example, the records can be sorted in linear time with nominal I/O and memory overhead on a single computer system.

A basic analogy of why limiting the number of containers can enhance or otherwise maximize finite computer system resources can be provided by a comparison with colanders that are used to drain off liquid or to rinse food. In this example, our colander only allows water to flow from 256 holes at any given moment. Assume that we have two colanders, colander A with $2^{128}$ (340,282,366,920,938,463,463,374,607,431,768,211,456) holes and colander B with $2^8$ (256) holes. The holes are synonymous to our virtual containers 39, whereby colanders A's holes represents the full range of a hash function having 128 bits (described later), while colander B's holes represent those provided by a hash mask of 120 bits. Since both colanders are the same size, and the diameter of the holes is proportional to the surface area of the colander, A's holes are smaller than colander B's holes. Since only 256 holes can be open at any given moment, which colander will drain faster? Obviously colander B will drain water faster.

Although this is an extreme example, it brings to light the bottleneck imposed on operating systems with writing to thousands of files at the same time for sorting large datasets.

An efficient searching approach could be to sort the dataset by key fields (e.g., a key field value of a specific key field) into X containers with each container holding the same number of records, with no two containers holding the same key field value. Then the exhaustive search for a key field would be reduced by a factor of X. It is likely that such approach would be NP-Complete, since checking the containers to ensure that they each contain the same number of records could be solved in polynomial time. Determining the placement of the records into the containers, however, would be very slow and difficult, given large datasets.

As such, according to various embodiments of the present invention, application of an algorithm, e.g., named the "Container Approximation Index algorithm," can solve the efficiency problem of searching large datasets, while maintaining or otherwise limiting the cost of infrastructure and personnel to that normally associated with an exhaustive search. This, application of the Container Approximation Index algorithm, according to various embodiments of the present invention, can resultingly reduce the infrastructure cost due to limited system overhead associated with the function of indexing and correspondingly vastly reduce system overhead required for searching the indexed datasets, dependent upon the size of the dataset and the frequency of searches.

Accordingly, embodiments of the program product 61 include an implementation of the Container Approximation Index algorithm to help solve the problem of container placement. By indexing the dataset by key field value into a finite number of containers, e.g., "X" containers 39 with each container 39 holding approximately the same number of records, the exhaustive search time can be reduced by nearly a factor of X, while the placement of records 37 is in linear time, e.g., ($\Theta(n)$) time, where n is the number of records 37 requiring to be containerized.

As record placement can be considered vital, according to the preferred configuration of program product 61, for a given key field value, each record 37 is placed into one, and only one, container 37, while all records 37 are approximately evenly distributed among the containers 39. Although, there is leniency in regards to some containers 39 holding fewer records 37 than average, with some containers 39 holding more records than average, according to this preferred configuration, a normalized distribution of records 37 among the containers 39 has been found to be a sufficient goal that satisfies the necessary requirements to provide the reduced search time with linear record placement time.

According to the preferred configuration of program product 61, an algorithm to achieve this goal, such as the Container Approximation Index Algorithm, can be implemented in the form of a "partial" top-down radix sort, where partial implies incomplete. According to an application of the algorithm, a digest on the key field is generated and modified in a manner that provides a set of unique values in a quantity that is proportional to the number of containers 39. This, in effect, forces collisions within the containers 39 based on the key field value. Such "modification" can be provided through application of a hash function as known to those skilled in the art.

In this exemplary embodiment of the program product 61, a Message Digest algorithm 5 (known as "MD5") provides one such hash function. The MD5 hash function is a cryptographic hash function with a 128-bit value, or a 32-character hexadecimal number. Masking the first 120 bits of the MD5 hash, for example, yields a 2-character hexadecimal number (8 bits) that is used as the address of a specific record's container placement. In this example, there would be $2^8$ or 256 containers 39. Viewed another way, this example provides an 8-bit radix based off of a 128-bit digest. In this configuration, during a search, each key field value of a specific key field common to the data records 37 would yield only one container address, while providing a substantially normalized distribution of records 37 across all of the containers 39

Pseudo code for the algorithm applying the parameters of this exemplary embodiment are provided as follows:

```
Containers = Array 256 File Descriptors
While Records to Sort
Hash = mask 120 bits MD5hash(key field of record)
Write record to Container[Hash]
End
```

Figure 2:
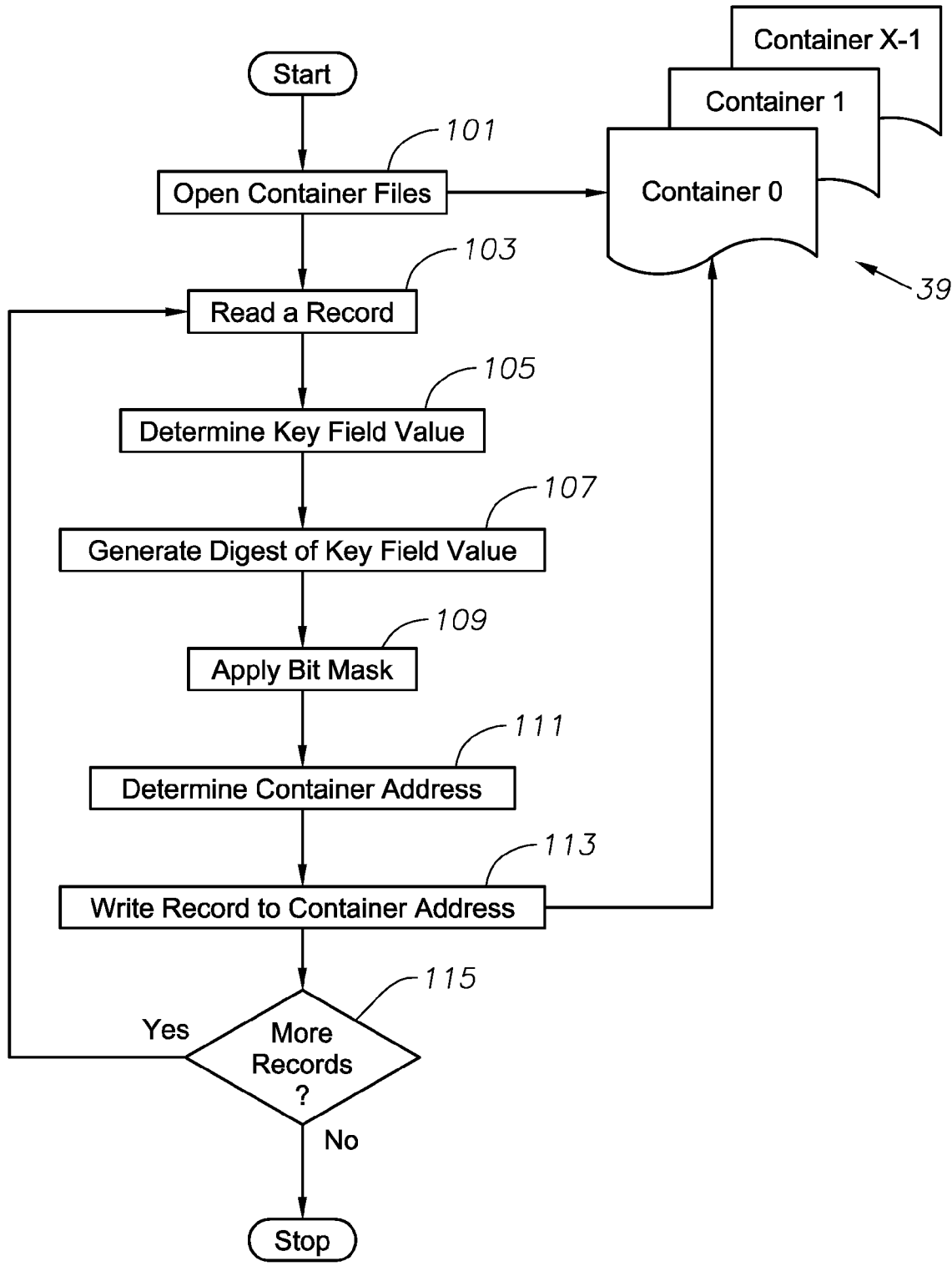
FIG. 2 is a schematic flow diagram of a method and operations for managing data according to an embodiment of the present invention.
Figure 3:
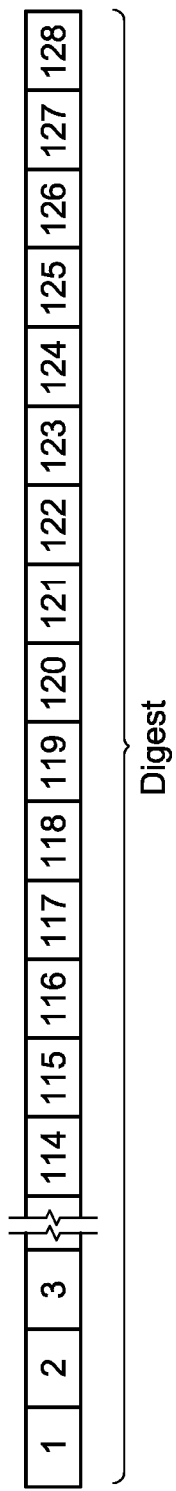
FIG. 3 is schematic diagram illustrating a digest of a key field value according to an embodiment of the present invention.

FIG. 2 provides a high-level flow diagram illustrating a method (and operations) for providing data management of a relatively large dataset including a plurality of records 37 for a computer system, e.g., computer 31. According to the illustrated embodiment of the present invention, the method can include the steps/operations of opening a finite number of containers (e.g., container files) 39, for example, equal to, or substantially equal to, a maximum number of file descriptors that can be opened simultaneously by a computer system (e.g., computer 31) to perform searching on the subject dataset of "n" records 37 (block 101). In this illustration, the maximum number of file descriptors, which can be simultaneously opened is equal to 256. Note, although the number of containers 39 need not be exactly equivalent to, or substantially equivalent to the number of file descriptors, as any number preferably less than the maximum is within the scope of the present invention, there are substantial benefits to providing a number of containers 39 at least substantially equal to the maximum number of file descriptors.

For an uninitialized dataset, and for each new record 37 added to the dataset, thereafter, the steps/operations can also include reading the record 37 (block 103), determining a key field value of a common key field of the respective record (block 105). The key field value is used to generate a digest of the key field value (block 107) illustrated at 71. Applying a hash function to the determined key field value can generate the digest (see, e.g., FIG. 3), having the same fixed size for each of the records 37. According to the preferred configuration, the digest 71 comprises an MD5 digest of the key field values. Other hash functions, as known to those skilled in the art, are, however within the scope of the present invention.

Figure 4:
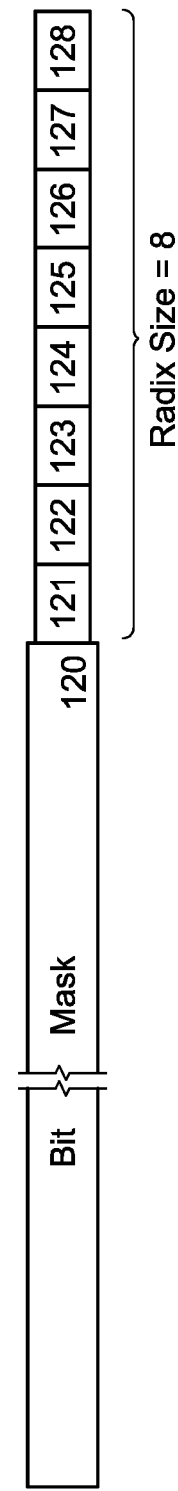
FIG. 4 is schematic diagram illustrating the digest of a key field value of FIG. 3 overlaid with a bit mask according to an embodiment of the present invention.

The steps/operations can also include modifying the digest 71 to determine a container address for the respective record 37 (block 109). As perhaps best shown in FIG. 4, this can be accomplished, for example, by applying to the digest 71 a bit-level hash mask conceptually illustrated at 73, to determine the container address for the record respective 37 (block 111) to be associated therewith. The hash mask 73 in this example has a size equal to an integer value of the size of the digest 71 minus a value proportional to $\log_2(X)$. According to various preferred configuration, this size should be equal to the number of desired containers 39, which should be a number that is less than the maximum number of file descriptors. Additionally, although the hash mask 73 can be in the form of a byte-level hash mask, a bit-level hash mask has certain advantages where the desired number of containers 39 is not an even multiple of four. FIG. 4 illustrates application of a 120-bit bit mask 73 placed against the digest 71 to generate the 8-bit container address.

Figure 5:
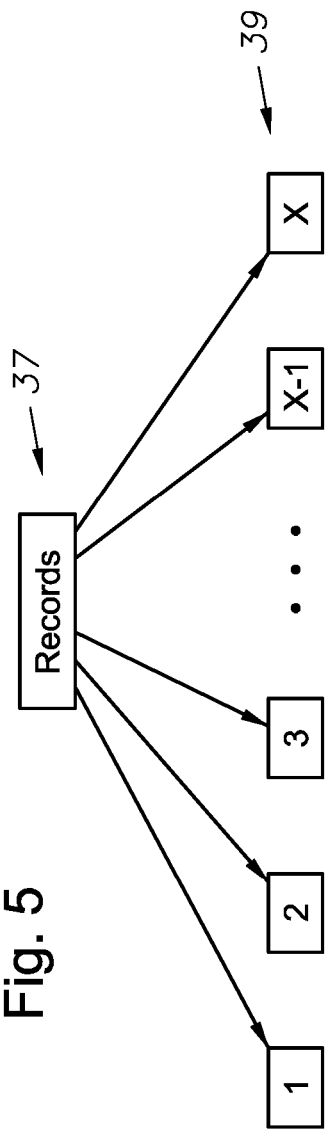
FIG. 5 is a schematic block diagram illustrating containerization of records according to an embodiment of the present invention.

As also shown in FIG. 5, using the determined 8-bit container address, the respective record 37 is written to the correlated container 39 associated with the determined container address (block 113). At least for the respective record 37, the algorithm can stop at this point, making the process synonymous to an incomplete top-down radix sort. If any additional records 37 remain which need to be "containerized" (block 115), the steps/operations will continue with reading the next record 37 and performing the steps/operations, described above. If or once all records 37 have been containerized, the process can close the open containers/container files 39.

As perhaps best shown in FIGS. 5, 6 and 7, the steps/operations can also include cascading the Container Approximation Index Algorithm in order to dramatically increase the number of containers 39, while still maintaining file descriptor utilization requirements below the maximum available to the computer system, and while keeping the sorting in linear time, e.g. ($\Theta(k*n)$), where "k" is the number of radixes and "n" is the number of records 37. As an example, suppose $2^{12}$ (4096) file descriptors can be open at one time, and therefore, the hash mask 73' would have a value of 116 bits to yield a 12 bit container address. Note, in this example, we consider the "X" value for FIG. 5 in the first level of FIG. 6 to be equal to 4096.

Figure 6:
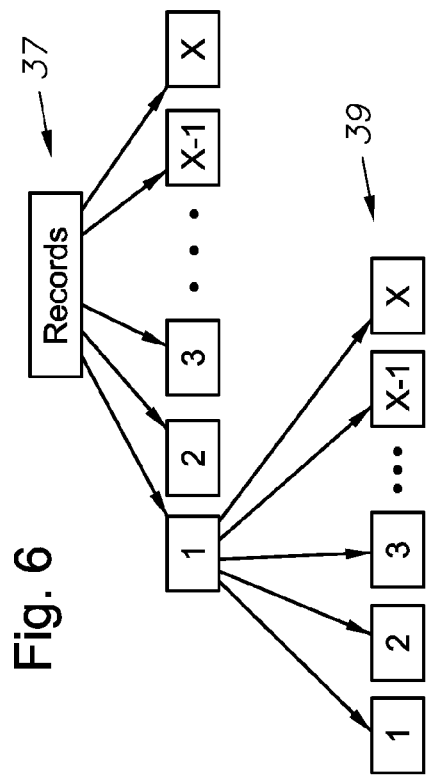
FIG. 6 is a schematic block diagram illustrating containerization of records according to an embodiment of the present invention.
Figure 7:
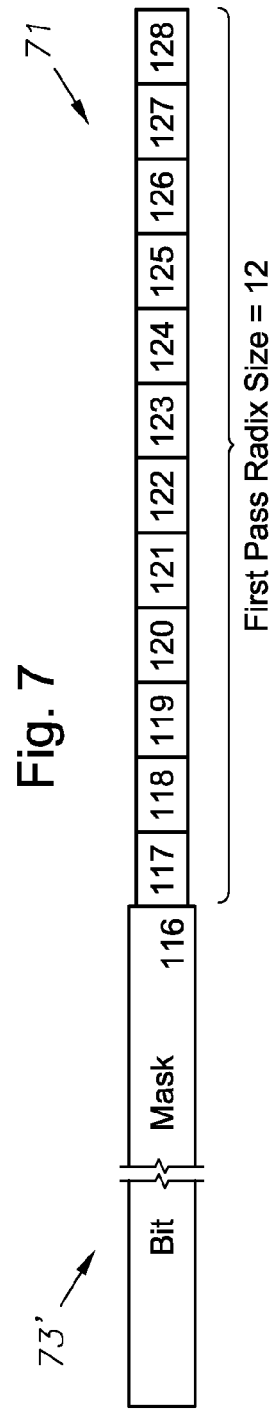
FIG. 7 is schematic diagram illustrating a digest of a key field value overlaid with a bit mask according to an embodiment of the present invention.
Figure 8:
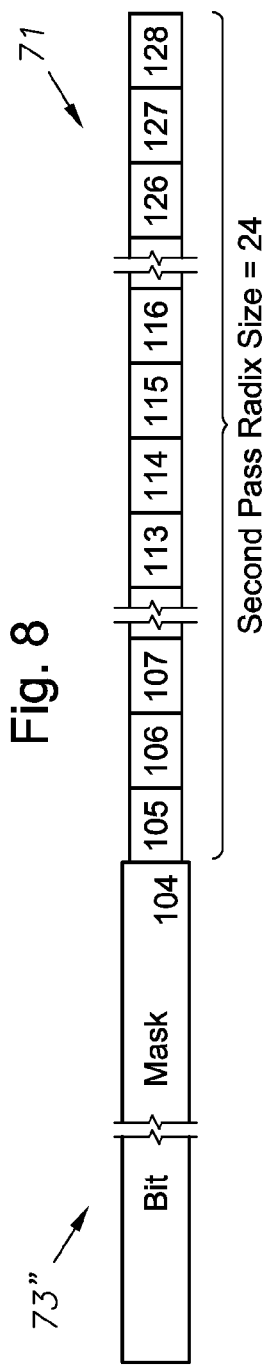
FIG. 8 is schematic diagram illustrating the digest of a key field value overlaid with a bit mask according to an embodiment of the present invention.

As perhaps best shown in FIGS. 6 and 8, by applying the algorithm onto itself and decreasing the size of the hash mark 73' from 116 bits to 104 bits on the second pass to form a "second pass" hash mask 73', the number of containers 39 is increased from $2^{12}$ (4096) to 224 (16,777,216), with record placement still in linear time, i.e., ($\Theta(2*n)$). Note, FIG. 6 illustrates the cascading for "container" #1 of FIG. 5, only. It should be understood that each of the 4096 containers would cascade to 4096 containers. Thus, the resulting container count would be 4096×4096 or 16,777,216 containers.

According to an alternative configuration, this cascading can be continued any preselected number of times in order to increase the number of containers 39 to a desired level, until the size of the original hash is exhausted (here MD5 at 2), thus performing a fully complete top-down radix sort.

In order to examine the extent of overall search time reduction and record container placement efficiency, several tests were run. In a first comparative test, two identical searches were run over the same data set to determine search time requirements. The first search was an exhaustive search, which took 433,982 seconds (approximately 5 days) to complete. The second search utilized the Container Approximation Index algorithm, with a search time of 402 seconds (6 minutes and 42 seconds). Application of the Container Approximation Index algorithm was shown to yield a search time reduction improvement of 99.9%. Note, this implementation of the Container Approximation Index algorithm utilized 128 containers. As such, the theoretical search time improvement was expected to be 99.2%, 1-1/128. The difference between the example and theory, however, was less than 0.7%.

Figure 9:
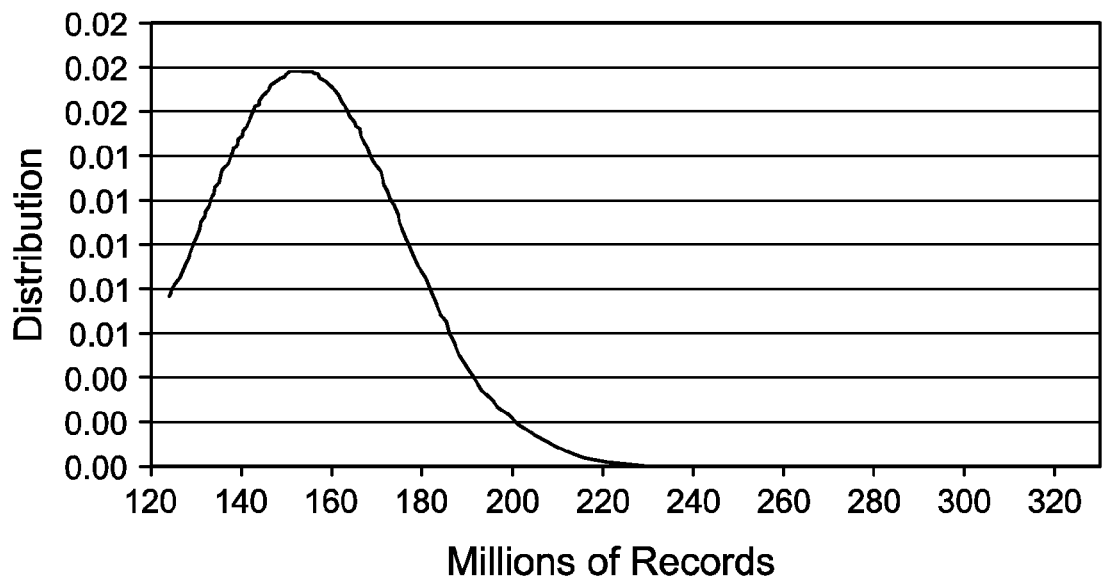
FIGS. 9-16 are graphs illustrating various test statistics resulting from application of various tests scenarios according to embodiments of the present invention.
Figure 10:
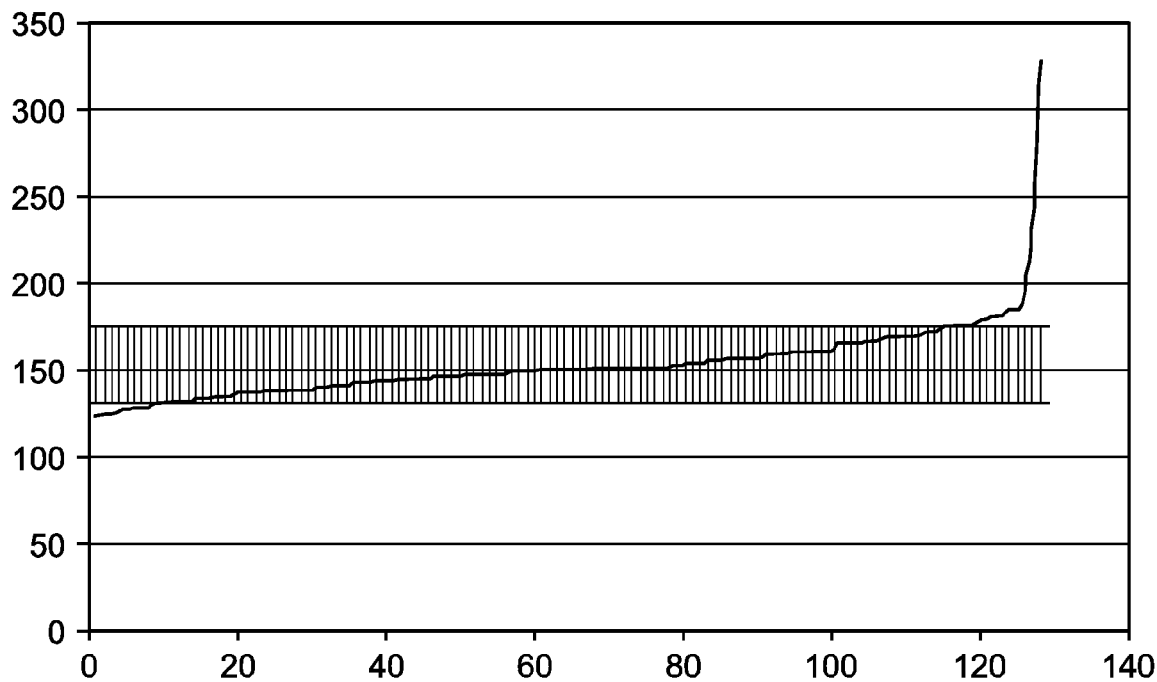

FIGS. 9-10 illustrate the results/statistics of a test directed to record container placement for a key field implemented using the Container Approximation Index algorithm. The total number of records in the dataset was 19.6 billion records 37 indexed with/sorted to 128 containers 39. The largest container 39 was found to contain 329 million records 37, while the smallest container 39 was found to contain 124 million. The mean amount of records 37 in a container was 153 million and the standard deviation (STDV) was 22 million records. The record container placement with the 68-95-99.7 rule for Normal Distribution is outlined in the table below.

| Records within | Record count in Millions | Percentage of Records Within: |
|---|---|---|
| 1 STDV | 16,580 | 84.59% |
| 2 STDV | 19,050 | 97.19% |
| 3 STDV | 19,271 | 98.32% |

There were two containers 39 with a STDV of record count of 2.5 or more. Each of these containers 39 were found to have at least one key field record count that was at least II STDV away from the rest of the records within their respective containers, for a total of three key fields.

Figure 11:
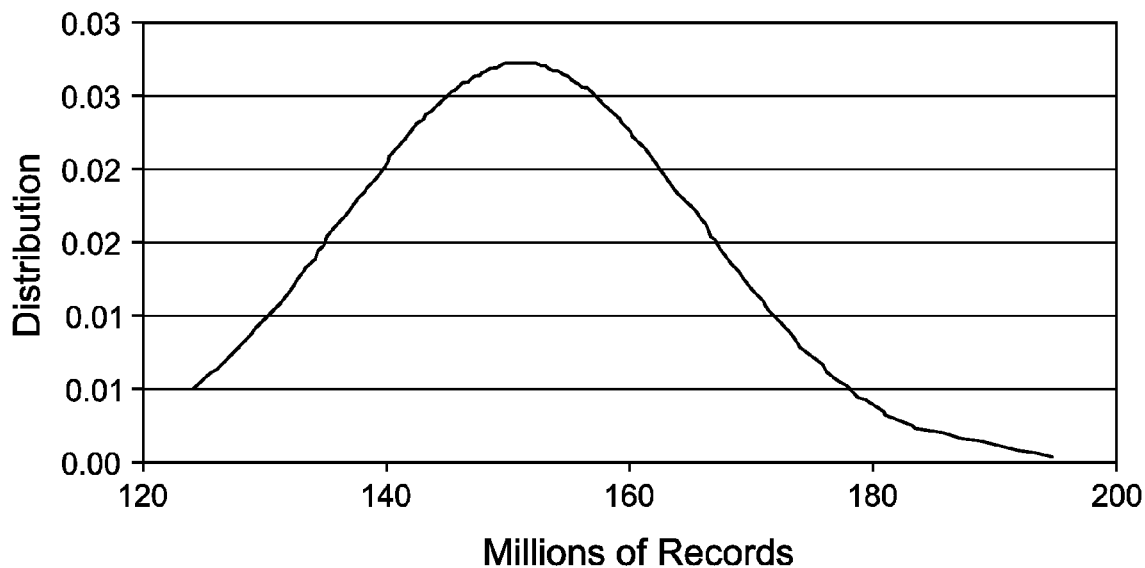
Figure 12:
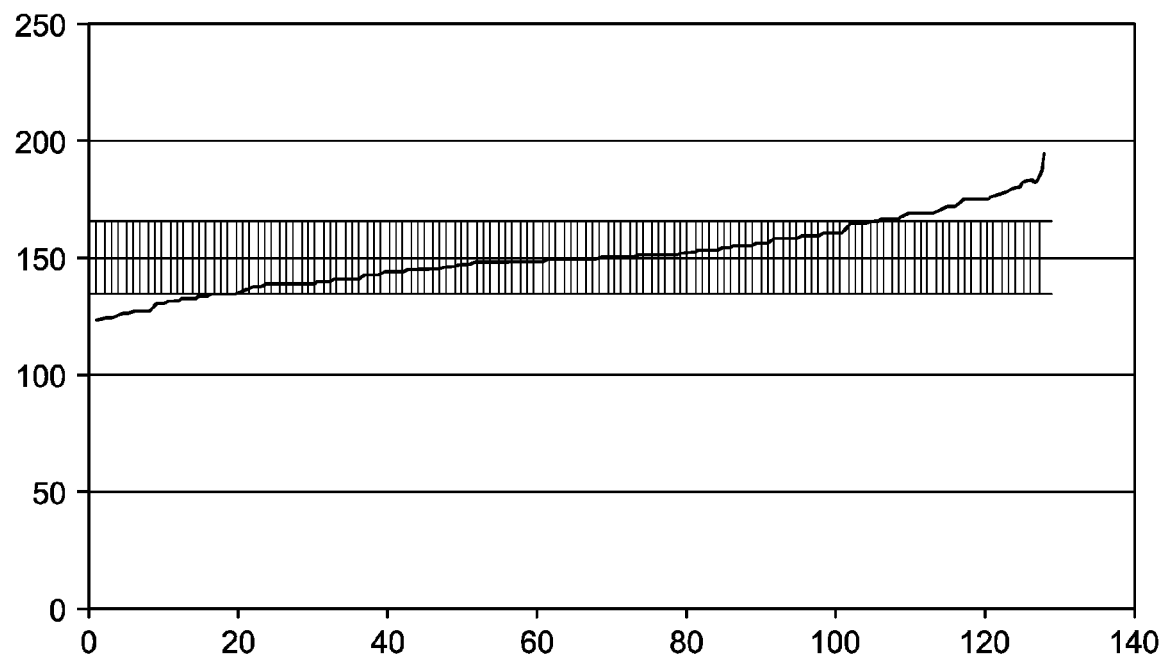

FIGS. 11-12 illustrate the results/statistics with record container placement for the same key field as above, excluding the records from the three key fields with a STDV greater than 11. The total number of records in the data set was 19.4 billion with 128 containers. The largest container held 195 million records, while the smallest container held 124 million. The mean amount of records in a container was 151 million and the standard deviation (STDV) was 15 million records. The record container placement with the 68-95-99.7 rule for Normal Distribution is outlined in the table below.

| Records within | Record count in Millions | Percentage of Records Within: |
|---|---|---|
| 1 STDV | 13,026 | 67.30% |
| 2 STDV | 18,793 | 97.09% |
| 3 STDV | 19,356 | 100% |

This is extremely close to a Normal Distribution of records across all containers, with the record container placement within 1 STDV being 0.7% off of 68%.

Figure 13:
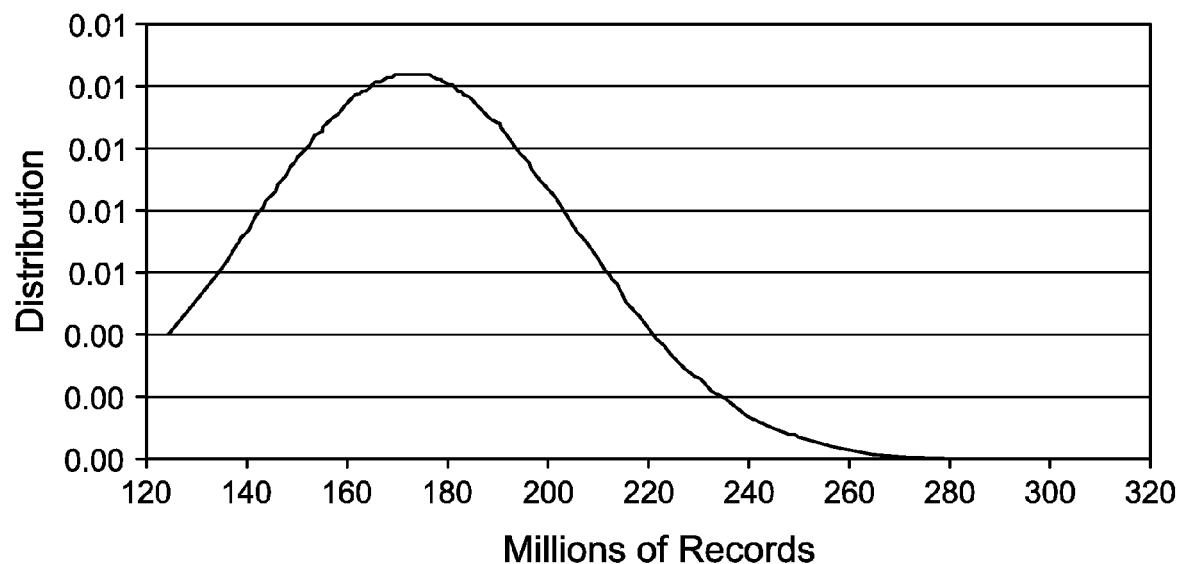
Figure 14:
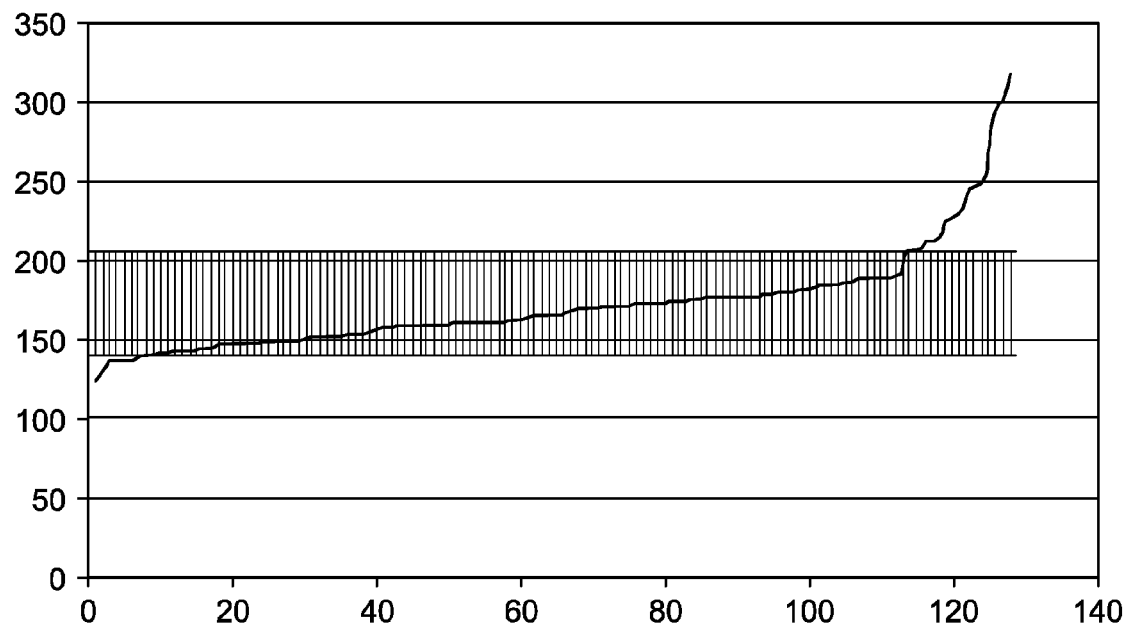

FIGS. 13-14 illustrate the results/statistics with record container placement for a second key field. The total number of records in the data set was 22.1 billion with 128 containers. The largest container holds 320 million records, while the smallest container holds 124 million. The mean amount of records 37 in a container was 173 million and the standard deviation (STDV) was 32 million records. The record container placement with the 68-95-99.7 rule for Normal Distribution is outlined in the table below.

| Records within | Record count in Millions | Percentage of Records Within: |
|---|---|---|
| 1 STDV | 17,851 | 80.73% |
| 2 STDV | 20,189 | 91.31% |
| 3 STDV | 21,194 | 95.85% |

There are four containers with a STDV of record count of 2.5 or more. Each of these containers had a single key field record count that was at least 25 STDV away from the rest of the records within their respective containers.

Figure 15:
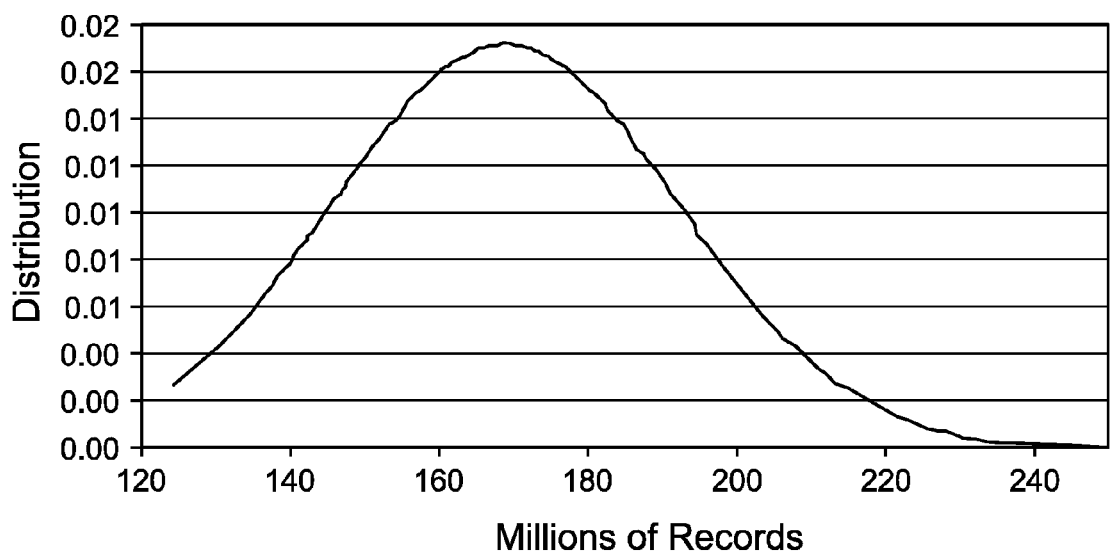
Figure 16:
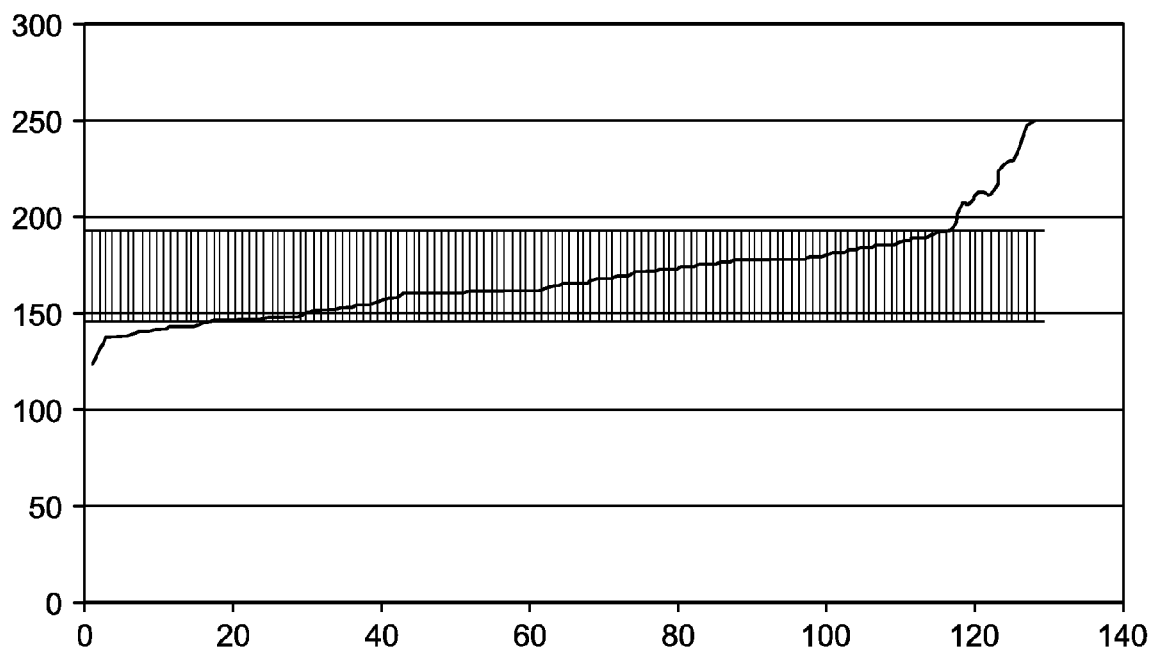

FIGS. 15-16 illustrate the results/statistics with record container placement for the same key field as above, excluding the records from the four key fields with a STDV greater than 25. The total number of records in the data set was 21.6 billion with 128 containers. The largest container held 250 million records, while the smallest container held 124 million. The mean amount of records in a container was 169 million and the standard deviation (STDV) was 23 million records. The record container placement with the 68-95-99.7 rule for Normal Distribution is outlined in the table below.

| Records within | Record count in Millions | Percentage of Records Within: |
|---|---|---|
| 1 STDV | 16,876 | 78.01% |
| 2 STDV | 20,210 | 93.43% |
| 3 STDV | 20,894 | 96.59% |

This is somewhat closer to a Normal Distribution of records across all containers, vs. the non-adjusted containers.

The anomalies of the examples discussed above can be attributed to anomalies among the key fields and data itself. The above are real world examples of real data, wherein the underlying data tends to have many instances of key fields well outside the STDV in regards to records 37 in their relevant containers 39. Nevertheless, anecdotal evidence shows that for large datasets with an exemplary container count of 128, records 37 are distributed among the containers 39 in a substantially Normal Distribution to reduce the overall search time.

As the container count increases, the ability of maintaining a Normal Distribution among the container is expected to diminish. This, however, does not appear problematic. One of the primary goals of application of the Container Approximation Index algorithm is to decrease the search time over large datasets. By increasing the number of containers 39, fewer records 37 would be searched against them. Thus, the reduction in search time stemming from the need to search fewer records 37 should offset and surpass any increase in search time resulting from increased variability of record count distribution across the containers 39.

It is important to note that while embodiments of the present invention have been described in the context of a fully functional system, those skilled in the art will appreciate that the mechanism of at least portions of the present invention and/or aspects thereof are capable of being distributed in the form of a computer readable medium in a variety of forms storing a set of instructions for execution on a processor, processors, or the like, and that embodiments of the present invention apply equally regardless of the particular type of signal bearing media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and certain types of transmission type media such as, for example, digital and analog communication links capable of storing the set of instructions. Such media can include, for example, both operating instructions and operations instructions related to the program product 61 and the method steps/operations, described above.

Accordingly, an embodiment of the present invention can include a computer readable medium that is readable by a computer, e.g., computer 31. The computer readable medium can include a set of instructions (e.g., the above described method steps/operations in computer readable form) that, when executed by the computer 31, cause the computer 31 to perform the operations of sorting (indexing) a dataset by key field values for each of a plurality of records 37 into a finite number of data containers 39—for example, a finite number "X" less than or equal to the number of file descriptors available to be used for the process. The operation of sorting the dataset by key field values can include, for each of the plurality of records 37, the operations of determining a key field value of the key field of each respective record, generating a digest 71 of the key field values, modifying the digest 71 to determine a container address for the respective record 37, and associating the respective record 37 with the determined container address.

According to a preferred configuration, the operation of generating a digest 71 includes applying a hash function to the determined key field value. The operation of modifying the diciest 71 to determine a container address for the respective record 37 can include applying a hash mask 73, 73' to the digest 71 to determine the container address for the record 37. The operation of associating the respective record 37 with the determined container address can include the operation of writing the respective record 37 to an address matching or otherwise associated with the determined container address (e.g., writing the record 37 to a correlated open container file).

According to an embodiment of the present invention, the operation of sorting a data set by key field values further includes the operation of increasing the number of containers 39 while maintaining record placement of the plurality of records 37 in linear time. This operation can include the operations of: decreasing the size of the hash mask, i.e., to form a "next-pass" hash mask 73"; applying the next-pass hash mask 73" to the digest 71 of the key field value to determine a container address for each respective record 37; and associating each respective record 37 with the determined container address, such as by writing the record 37 to a correlated open container file.

Various embodiments of the computer readable medium further include instructions to perform the various other operations described in more detail with respect to the program product 61 and the method steps/operations.

In the drawings and specification there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A method of managing a large data set, the method comprising the steps of:
   determining a maximum number of file descriptors that can be open simultaneously by an operating system operating on a selected computer;
   opening, by a computer, a finite number of containers, the finite number of containers being no more than, but approximately equal to, the determined maximum number of file descriptors, and being substantially less than the number of the plurality of records;
   sorting, by the computer, a dataset of a plurality of records by unique key field value for each of the plurality of records to the finite number of data containers, at least an initial pass of the sorting comprising an incomplete top-down radix sort to thereby substantially reduce computer resources required to perform a record search, the step of sorting comprising:

determining the key field value of the key field of the respective record, generating a digest of the key field value, the digest having a same fixed size for each of the plurality of records, the step of generating the digest comprising the step of applying a hash function to the determined key field value, modifying the digest to determine a container address for the respective record, the step of modifying the digest comprising the step of applying a bit-level hash mask to the digest to determine the container address for the respective record, the bit-level hash mask having a size equal to an integer value of the size of the digest minus an integer value related to $\log_2$(finite number of containers), and associating the respective record with the determined container address; and when it is desired to sort the records into an increased number of containers, performing the steps of:

opening a finite number of next-pass data containers for each of the finite number of data containers associated with the sorted plurality of records defining prior-pass data containers, decreasing the size of the hash mask to define a next-pass hash mask, applying the next-pass hash mask to the digest of the key field value for each subset of the plurality of sorted records associated with a separate one of the prior-pass data containers to determine a next-pass container address for each respective record, and associating each respective record with the respective determined next-pass container address.

2. A method as defined in claim 1, wherein the digest comprises a Message Digest algorithm 5 ("MD 5") digest.

3. A method as defined in claim 1,
wherein each of the plurality of containers contains multiple of the plurality of records; and
wherein the step of associating each respective record with the respective determined next-pass container address comprises writing the respective record to an address associated with the determined container address.

4. A method as defined in claim 1, wherein the step of opening a finite number of next-past data containers comprises increasing the number of containers exponentially by the finite number of containers while maintaining record placement of the plurality of records in linear time.

5. A method as defined in claim 4,
wherein each of the plurality of records comprises a unique record different from the other records;
wherein the step of increasing the number of containers exponentially further includes performing the step of opening a finite number of next-pass data containers for each separate one of a plurality of sub levels of data containers for a plurality of sub levels; and
wherein the method further comprises performing the steps of: decreasing, applying, and associating until the size of the hash is exhausted to define cascading to thereby create a fully complete top-down radix sort.

6. A method as defined in claim 1, wherein the plurality of records are approximately evenly distributed over the plurality of containers responsive to the sorting to thereby reduce search time for a record by a factor of the number of containers.

7. A method as defined in claim 1, wherein the plurality of records have a substantially normalized distribution of records across the plurality of containers responsive to the sorting.

8. A method as defined in claim 1, further comprising the step of:
searching for a specific record responsive to the key field value of the record;
wherein the plurality of records comprises at least a billion records; and
wherein the searching and the sorting are performed by a single operating system of a multi-processor computer.

9. Program product to manage a large data set stored in a computer readable tangible medium, the program product including instructions that when executed by a computer, cause the computer to perform the operations of:

opening a finite number of containers, the finite number of containers being no more than a maximum number of file descriptors permitted to be simultaneously opened by an operating system operating on a selected computer, and being substantially less than the number of the plurality of records;

sorting a dataset of a plurality of records by unique key field value for each of the plurality of records to the finite number of data containers, at least an initial pass of the sorting comprising an incomplete top-down radix sort to thereby substantially reduce computer resources required to perform a record search, the operation of sorting the data set comprising:

determining the key field value of the key field of the respective record, generating a digest of the key field value, the digest having a same fixed size for each of the plurality of records, the operation of generating a digest comprising applying a hash function to the determined key field value, modifying the digest to determine a container address for the respective record, the operation of modifying comprising applying a bit-level hash mask to the digest to determine the container address for the respective record, the bit-level hash mask having a size equal to an integer value of the size of the digest minus an integer value related to $\log_2$(finite number of containers), and associating the respective record with the determined container address;

opening a finite number of next-pass data containers for each of the finite number of data containers associated with the sorted plurality of records defining prior-pass data containers, the finite number of next-past data containers being no more than, but approximately equal to, the determined maximum number of file descriptors; and performing the operations of: opening a finite number of next-pass data containers for each of the finite number of data containers associated with the sorted plurality of records defining prior-pass data containers, decreasing the size of the hash mask to define a next-pass hash mask, applying the next-pass hash mask to the digest of the key field value for each subset of the plurality of sorted records associated with a separate one of the prior-pass data containers to determine a next-pass container address for each respective record, and associating each respective record with the respective determined next-pass container address.

10. Program product as defined in claim 9, wherein the operation of associating each respective record with the respective determined next-pass container address includes the operation of writing the respective record to the determined container address.

11. Program product as defined in claim 10, wherein the operation of opening a finite number of next-past data containers comprises increasing the number of containers exponentially by the finite number of containers while maintaining record placement of the plurality of records in linear time.

12. Program product as defined in claim 11, wherein the plurality of records are approximately evenly distributed over the respective containers responsive to the sorting processes to thereby reduce search time for a record by a factor of the number (X) of containers.

13. Program product as defined in claim 9,
wherein the finite number of containers is approximately equal to the maximum number of file descriptors permitted to be simultaneously opened; and
wherein the plurality of records have a substantially normalized distribution of records across the plurality of containers responsive to the sorting.

14. A computer system to manage a large data set, the computer system comprising:
a computer;
first memory associated with the computer;
a first program product defining an operating system stored in the first memory associated with the computer;
second memory separate from the first memory and in communication with the operating system so that the operating system enhances access to the second memory;
a dataset stored in the second memory and arranged so that a plurality of data records are positioned in a plurality of data containers; and
second program product stored in the first memory and readable by the operating system of the computer to cause the computer to perform the operation of:
opening a finite number of data containers, the finite number of data containers being no more than a maximum number of file descriptors permitted to be simultaneously opened by the operating system of the computer, and being substantially less than the number of the plurality of data records,
sorting the dataset by unique key field value for each of the plurality of data records to the plurality of data containers, at least an initial pass of the sorting comprising an incomplete top-down radix sort to thereby substantially reduce computer resources required to perform a record search, the operation of sorting the data set comprising:
determining the key field value of the key field of the respective record,
generating a digest of the key field value, the digest having a same fixed size for each of the plurality of records, the operation of generating a digest comprising applying a hash function to the determined key field value,
modifying the digest to determine a container address for the respective record, the operation of modifying the digest comprising applying a bit-level hash mask to the digest to determine the container address for the respective record, the bit-level hash mask having a size equal to an integer value of the size of the digest minus an integer value related to $\log_2$(finite number of containers), and
associating the respective record with the determined container address,
opening a finite number of next-pass data containers for each of the finite number of data containers associated with the sorted plurality of records defining prior-pass data containers, the finite number of next-past data containers being no more than, but approximately equal to, the determined maximum number of file descriptors, and
performing the operations of: opening a finite number of next-pass data containers for each of the finite number of data containers associated with the sorted plurality of records defining prior-pass data containers, decreasing the size of the hash mask to define a next-pass hash mask, applying the next-pass hash mask to the digest of the key field value for each subset of the plurality of sorted records associated with a separate one of the prior-pass data containers to determine a next-pass container address for each respective record, and associating each respective record with the respective determined next-pass container address.

15. A computer system as defined in claim 14, wherein the operation of associating each respective record with the respective determined next-pass container address includes the operation of writing the respective record to the determined container address.

16. A computer system as defined in claim 15, wherein the operation of opening a finite number of next-past data containers comprises increasing the number of containers exponentially by the finite number of containers while maintaining record placement of the plurality of records in linear time.

17. A computer system as defined in claim 14, wherein the finite number of next-pass data containers for each of the prior-pass data containers receiving the plurality of data records is approximately equal to the maximum number of file descriptors permitted to be simultaneously opened by the computer.

18. A computer system as defined in claim 14, wherein the finite number of next-pass data containers for each of the prior-pass data containers receiving the plurality of data records is less than or equal to the maximum number of file descriptors permitted to be simultaneously opened by the computer.

19. A computer system as defined in claim 14, wherein the plurality of data records has a substantially normalized distribution among the plurality of prior-pass data containers responsive to the sorting.

* * * * *

UNITED STATES PATENT AND TRADEMARK OFFICE
CERTIFICATE OF CORRECTION

| | |
|---|---|
| PATENT NO. | : 8,095,548 B2 |
| APPLICATION NO. | : 12/251065 |
| DATED | : January 10, 2012 |
| INVENTOR(S) | : Matthew A. Pennington |

Page 1 of 1

It is certified that error appears in the above-identified patent and that said Letters Patent is hereby corrected as shown below:

In The Claims

At column 13, at claim 4, line 43, please delete the word "past" and replace it with the word --pass--;

At column 14, at claim 11, line 66, please delete the word "past" and replace it with the word --pass--;

At column 16, at claim 16, line 33, please delete the word "past" and replace it with the word --pass--.

Signed and Sealed this
Sixth Day of January, 2015

Michelle K. Lee
*Deputy Director of the United States Patent and Trademark Office*